United States Patent
Alaoui et al.

(10) Patent No.: US 12,130,126 B2
(45) Date of Patent: Oct. 29, 2024

(54) IR ABSORPTION AND INTERFEROMETRY SYSTEM FOR DETERMINING A THICKNESS OF A MATERIAL BODY

(71) Applicant: CARGILL, INCORPORATED, Wayzata, MN (US)

(72) Inventors: Amina Alaoui, Grimbergen (BE); Loic Jean-François Autret, Pruillé (FR); Jeremy Anthony Philippe Gruel, Amstelveen (NL)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 18/561,916

(22) PCT Filed: May 18, 2022

(86) PCT No.: PCT/US2022/029810
§ 371 (c)(1),
(2) Date: Nov. 17, 2023

(87) PCT Pub. No.: WO2022/245927
PCT Pub. Date: Nov. 24, 2022

(65) Prior Publication Data
US 2024/0240934 A1    Jul. 18, 2024

(30) Foreign Application Priority Data

May 19, 2021  (EP) .................................... 21174725
May 19, 2021  (EP) .................................... 21174728

(51) Int. Cl.
*G01B 11/06* (2006.01)
*G01N 21/952* (2006.01)

(52) U.S. Cl.
CPC ...... *G01B 11/0625* (2013.01); *G01B 11/0675* (2013.01); *G01N 21/952* (2013.01)

(58) Field of Classification Search
CPC ............ G01B 11/0625; G01B 11/0675; G01N 21/952
See application file for complete search history.

(56) References Cited

U.S. PATENT DOCUMENTS

| | | |
|---|---|---|
| 2009/0010385 A1 | 1/2009 | Ott |
| 2011/0210691 A1 | 9/2011 | Ziprani |
| 2013/0038861 A1 | 2/2013 | Calvimontes |
| 2015/0076353 A1 | 3/2015 | Bathelet |
| 2020/0357704 A1 | 11/2020 | Schaefer |

FOREIGN PATENT DOCUMENTS

WO    2020024724 A1    2/2020

*Primary Examiner* — Rebecca C Bryant

(57) ABSTRACT

Sensor system for determining a thickness of a material body, e.g. a container such as a bottle, comprising an IR absorption sensor operable on a first zone of the body, to determine, at a first accuracy, first data relating to a first parameter pertaining to thickness of the first zone; and comprising an interferometry sensor operable on a second zone of the body, to determine, at a second accuracy, second data relating to a second parameter pertaining to thickness of the second zone, the second accuracy being higher than the first accuracy; and wherein the sensor system is configured for providing the first data and the second data to a processor, the processor being configured for taking into account the first data as well as the second data to determine the thickness of the body over the first zone at an accuracy higher than the first accuracy.

12 Claims, 2 Drawing Sheets

IR ABSORPTION AND INTERFEROMETRY SYSTEM FOR DETERMINING A THICKNESS OF A MATERIAL BODY

CROSS REFERENCE TO RELATED APPLICATIONS

This application is a national phase application of PCT Application No. PCT/US2022/029810, filed May 18, 2022, which claims the benefit of European Application No. 21174728.2 filed May 19, 2021 and European Patent Application No. 21174725.8, filed May 19, 2021, each of which are incorporated by reference herein in its entirety.

FIELD OF THE INVENTION

The present disclosure relates generally to material thickness sensors. In particular, the present disclosure relates to a sensor system for determining a thickness of a material body, a production machine, a method for determining a thickness of a material body, a method for adjusting a production process of a material body, and use of a sensor system for adjusting a production process of a material body.

BACKGROUND

In the context of production, in particular in the context of stretch blow molding but also in other contexts, product quality is an important objective, because poor product quality may jeopardize productivity of production machines, e.g. blow molding machines, as the machines may need to be reconfigured to produce products of better quality. An important factor of product quality is the material distribution of the product. This applies in particular to products such as stretch blow molded bottles, but also to other types of products.

The material distribution of the product, e.g. a bottle, also is important to reduce waste in the production process. Moreover, a good material distribution may also make the product structurally stronger and thus more durable, may also improve permeability or non-permeability (whichever is desired in the particular application), and may also improve the product's optical properties, e.g. by providing uniform reflection.

Common practice of determining the material distribution of products involves manual sampling and measurement of products with a destructive approach (a hot wire cutter or a topload system, for instance). To a certain extent, if poor quality products are found, the production line can at least partially be halted to adjust the production machines, e.g. blow molding machines.

Such manual sampling and measurement of products, e.g. bottles, is destructive or non-destructive. Examples of destructive measurement approaches include cutting pre-defined sections of the products and weighing the sections— which gives only a general indication of the material distribution, however, and which may accept poor quality products if all sections deviate from approved range: moreover, for very light-weight products, the measurement error percentage becomes unacceptable. Examples of non-destructive measurement approaches include positioning a magnetic probe on one side of the product material and positioning a small metal ball on the opposite side of the product material, near the magnetic probe tip. The distance between the magnetic probe tip and the small metal ball, and thus the material thickness of the product on a very specific spot (that is difficult to reproduce), could then be determined via the Hall effect. However, the introduction of a small metal ball in a food safe environment may require destruction of the product afterwards, in particular for food safe containers like bottles. However, for products such as films that are deposited onto a surface of another object, this type of measurement approach is unavailable. So even if the food safe product, e.g. a bottle, is not destroyed, it cannot be reused either.

It is a disadvantage of such manual sampling and measurement approaches that they are time-consuming and cumbersome, as individual products need to be sampled, prepared and tested. This applies in particular to bottles, but also to other types of products. Moreover, the above-described magnetic probe tip and small metal ball must contact the product surface. Furthermore, since these approaches are manual, they are very sensitive to different individual human operators.

More recently, approaches have been presented to overcome this disadvantage. These approaches rely on interferometry scanning of products.

These interferometry scanning approaches have the advantage that they are non-destructive and that they can be used online, i.e. in the production line. Moreover, these interferometry scanning approaches have the advantage that they are low-cost.

Examples of these interferometry scanning approaches include for example infrared, IR, scanning using an IR light emitter and a IR light sensor, although other types of electromagnetic radiation may also be used. When radiation is emitted onto a transparent material having an outer surface and an inner surface, a first portion of the radiation is reflected off the outer surface, and a second portion of the radiation is reflected off the inner surface. Thus, the interferometry sensor may detect two distinct intensity peaks on a spectral graph. When this detection is combined with the specific refractive index of the material, defined as $n=c/v$, where c represents the speed of light in a vacuum and v represents the phase velocity of light in the material, the thickness of the material can be determined.

STATEMENTS OF THE INVENTION

It is a disadvantage of the above-described interferometry scanning approaches that the material thickness is only determined for one small area, namely the area through which IR light is emitted and sensed. Typically, such a small area is circa 1-3 mm wide. Therefore, it is impossible to determine the material distribution over an extensive area of the product, rather than a small area. This applies in particular to bottles, but also to other types of products.

For material objects of any type of shape, including flat but also curved objects, it may be desirable to determine material distribution over an extensive area. Besides the above mentioned aims, another aim of determining material distribution may additionally or alternatively be, for example when determining material distribution of a flat object, such as a film, to ascertain the thickness of the film over an extensive area, to better ensure that the film has uniform thickness, e.g. to better guarantee properties of optical reflection (e.g. in display coatings or coatings for luxury goods) or electrical conduction. However, the principles presented in the present disclosure may be applicable to any type of object, including not only bottles but also other types of products. Therefore, in the context of the present disclosure, aspects should not be construed to be limited to bottles only, although this is the currently preferred application.

Simply making a plurality of measurements haphazardly offers only very limited insight in the material distribution of the product, e.g. a bottle. Also, simply juxtaposing a plurality of IR emitters and sensors next to each other offers only limited insight in the material distribution of the product, because the emitters and sensors have housings that are greater than the areas that each emitter and sensor cover. This leads at least to gaps in the coverage over the total area of the product. Moreover, interferometry sensors are typically very expensive, so it is desirable to limit the required number of interferometry sensors.

It is an insight of the inventors that the above-described interferometry scanning approach may be improved by also considering a different approach to determine material thickness, in order to obtain better insight in the material distribution of an object, in particular over a more extensive area of the object.

It is therefore an objective of the present disclosure to provide a sensor system that does not suffer from the above-described disadvantages. More in particular, aspects according to the present disclosure may have the aim of saving material, of improving structural properties of material bodies, and/or of improving optical properties of material bodies.

According to a first aspect of the present disclosure, there is provided a sensor system for determining a thickness of a material body, e.g. a container such as a bottle, comprising at least one sensor: wherein the at least one sensor is operable on a first zone of the body, to determine, at a first accuracy, first data relating to a first parameter pertaining to thickness of the first zone: wherein the at least one sensor is operable on a second zone of the body, to determine, at a second accuracy, second data relating to a second parameter pertaining to thickness of the second zone, the second accuracy being higher than the first accuracy: and wherein the sensor system is configured for providing the first data and the second data to a processor, the processor being configured for taking into account the first data as well as the second data to determine the thickness of the body at an accuracy higher than the first accuracy. Moreover, the at least one sensor comprises at least one IR absorption sensor and at least one interferometry sensor: the at least one IR absorption sensor is operable on the first zone of the body, to determine, at the first accuracy, the first data: and the at least one interferometry sensor is operable on the second zone of the body to determine, at the second accuracy, the second data.

By determining the first data—and thus explicitly or implicitly the thickness of the first zone—at a relatively lower first accuracy and then determining the second data—and thus explicitly or implicitly the thickness of the second zone—at a relatively higher second accuracy, the sensor system allows a downstream processor to use the more accurate second data to draw improved conclusions about the less accurate first data, but also over the first zone. Thus, the overall thickness is better determined, at least over the first zone. This may lead to improved material savings, improved structural properties of the material bodies, and/or improved optical properties of the material bodies. Moreover, the characteristics and strengths of IR absorption sensors and those of interferometry sensors may more effectively be utilized, because the IR absorption sensor may be faster and less expensive and may cover relatively larger zones of the material body but at a relatively lower accuracy, whereas the interferometry sensor may cover relatively smaller zones of the material body but at a relatively higher accuracy. Of course, the skilled person will appreciate that other types of sensors may also benefit from this distinction between relatively larger zones of the material body at a lower accuracy vs. relatively smaller zones of the material body at a relatively higher accuracy, and that it may thus be preferred that the second zone is smaller than the first zone.

In the context of the present disclosure, a thickness of an object may be construed to refer to the shortest measurable distance between a first point on one surface of the object and a second point on the another surface of the object. Most usefully for desired applications, the one surface and the other surface are preferably chosen to be the outside wall and the inside wall of containers, to best correspond with what is colloquially meant with the thickness of such containers. This applies in particular to bottles, but also to other types of containers. It is noted that bottles are a currently preferred type of containers, although other types of containers, having different shapes and/or different functions, may also be used effectively in aspects of the present disclosure.

It is noted that, in principle, any kind of material can be used in the material body, including transparent as well as non-transparent materials.

The skilled person will understand that in the expression "data relating to the parameter pertaining to thickness of the first zone", the thickness may be interpreted as the actual tangible volumetric thickness, the parameter pertaining to the thickness may be interpreted as either that thickness or another physical parameter that can be reduced to or converted into that thickness, for example absorption energy, spectral distance, capacitance, etc., and data relating to that parameter may be interpreted as any suitable representation of such a parameter, for example as one or more numerical values and/or as an analog signal, e.g. an electrical signal, characterized by at least one of frequency, amplitude, shape, voltage and current. In this context, the term analog may be taken to mean that the signal is represented by continuously variable physical quantities, as opposed to digital.

It is further noted that, in the context of the present disclosure, the measurement accuracy of a first underlying physical parameter from which the thickness of the first zone can be derived may actually be better (i.e. more accurate) than the measurement accuracy of a second underlying physical parameter from which the thickness of the second zone can be derived, while still the thickness of the first zone can only be determined at a relatively lower accuracy than the thickness of the second zone, for example if a physical relationship used for one or both of said derivations involves an uncertainty.

By combining both functionalities into potentially only one sensor, or preferably as few as possible sensors, the sensor system may be kept compact.

Moreover, it is an advantage of the above described aspect that the first thickness can be improved using the second thickness during a production process without requiring the production process to be halted.

The at least one sensor may be operable on the second zone to determine the second data at a second accuracy higher than the first accuracy in any of the following non-exhaustive situations: if the second zone is smaller than the first zone, and/or if determining the second data at the second accuracy requires a relatively high expenditure compared to determining the first data at the first accuracy, for example if the second accuracy requires a costly sensor, and/or a long sensing time, and/or a large housing or working volume, in comparison to the first accuracy.

Preferably, the at least one sensor comprises at least one of the following: an ultrasonic sensor: an electromagnetic sensor, preferably a Hall sensor or a capacitive sensor.

Advantageously, these types of sensors are reliable and resistant to harsh industrial environments. Moreover, light-based and sound-based types of sensors are highly immune to electromagnetic interference. It is a further advantage of these types of sensors that they can function regardless of texture or color or degree of transparency of the material body. Preferably, the at least one sensor is contactless, in order to reduce wear of the sensor and/or the chance of contamination of the material body.

Note that polyethylene terephthalate, PET, reflects IR light at a known refractive index. Beside PET, various other types of materials such as HDPE (high-density polyethylene), LDPE (low-density polyethylene), other plastics, glass, etc., all having known refractive indices, can also be used.

In this context, IR absorption may operate based on the Beer-Lambert law, stating $I=I_0 e^{-uw}$, where $I_0$ is the signal with no sample, I is the signal with a sample, u is the absorption coefficient, and w is the weight of the sample. The Beer-Lambert law may be rearranged to $w=(1/u)\ln(I_0/I)$. Therefore, given the wavelength of the IR radiation, the weight, and thus the thickness, of a sample may be determined as the logarithm of the signal attenuation divided by the absorption coefficient.

Note that polyethylene terephthalate, PET, absorbs IR light at specific rates depending on the weight, and thus the thickness, of the material that absorbs the IR light. Beside PET, various other types of materials such as HDPE (high-density polyethylene), LDPE (low-density polyethylene), other plastics, glass, etc. can also be used.

Preferably, when using an IR absorption sensor, it is preferred to position an IR receiver and a complementary IR emitter on opposite sides of the product, e.g. a bottle, along the same axis. Consequently, the measured thickness is that of both walls of the product, e.g. the bottle, but there is no difficulty in halving this measured thickness to arrive at a good approximation of the thickness of one of the two walls.

It is a further advantage of using IR interferometry and IR absorption that IR light is low-energy radiation, which may help reduce or prevent curing of any materials that may be present, e.g. adhesive materials.

Preferably, the processor is configured for said taking into account of the first data as well as the second data by using the second data to interpret, i.e. calibrate, the first data.

In this manner, the processor can use the more accurate second thickness to draw improved conclusions about the less accurate first thickness, but over the first zone. Thus, the overall thickness may be better determined. This may lead to improved material savings, improved structural properties of the material bodies, and/or improved optical properties of the material bodies.

Preferably, the processor is configured for said taking into account of the first data as well as the second data by setting a reference value for the first data based on the second data.

In this manner, the processor may optimally interpret the first data.

Preferably, the second zone is at least partially, preferably entirely, contained in the first zone.

In this manner, the thickness of the body may be determined with greater accuracy, because the second data may represent a zone contained in (and thus relating to), preferably entirely contained in (and thus enclosed by), the first zone, such that the relationship between the first data and the second data may be more clear.

The skilled person will understand that the term partially in the context of the present disclosure may refer to "to some extent", or "incompletely". Furthermore, the expression "at least partially" may mean "either partially or entirely", wherein entirely means the same as completely. The skilled person will appreciate that example percentage values that express these notions, may be the following: entirely or completely may of course refer to 100%, but in engineering practice may also mean a percentage value close to 100%, e.g. 99.9% or even 99% or even, if there is sufficient tolerance, any percentage value in the range 90-100%. Likewise, the skilled person will appreciate that example percentage values that express the notion of "partially" may be anywhere in the range]0%, 100%[, expressed mathematically, that is as the open region including all points between the extreme end-points of 0% and 100%.

Preferably, at least one of the first zone and the second zone is a composite zone comprising a plurality of mutually disjoint zones.

In this context, the term composite may be taken to mean that the zone is made up at least of distinct parts or elements, namely the mutually disjoint zones.

In this manner, a better insight may be obtained in the thickness over the overall material body. Also, in this manner, it may be more easy to mount several sensors close to each other, if a plurality of sensors is used.

Preferably, each sensor comprises at least one receiver and at least one complementary emitter.

In particular aspects, the material may be transparent, for which suitable sensors are readily available to the skilled person. In the context of the present disclosure, the term transparent materials may also include semi-transparent materials. Alternatively, the material may also be non-transparent, for which suitable sensors are also available to the skilled person.

Preferably, the sensor system comprises the processor, wherein the processor is configured for receiving the first data and the second data.

Preferably, the at least one sensor is positioned such that its emitted signals travel perpendicularly to a tangent of at least one of the first zone and the second zone.

In this manner, the sensor system may determine the data of the material body more accurately.

According to a second aspect of the present disclosure, there is provided a production machine comprising a sensor system according to any one of the above-described aspects.

The considerations and advantages of aspects of the sensor system may apply, mutatis mutandis, to aspects of the production machine. Examples of such a production machine may include, to name a few: blow molding machines, in particular bottle stretch blow molding machines, but also extrusion machines, injection machines, 3D printing machines, etc. Also, production machines may include machines for labelling items or machines for repositioning labels on items.

According to a third aspect of the present disclosure, there is provided a method for determining a thickness of a material body, e.g. a container such as a bottle, the method comprising: determining, at a first accuracy, first data relating to a first parameter pertaining to thickness of a first zone of the body: determining, at a second accuracy, second data relating to a second parameter pertaining to thickness of a second zone of the body, the second accuracy being higher than the first accuracy: and providing the first data and the second data to a processor, the processor being configured for taking into account the first data as well as the second data to determine the thickness of the body at an accuracy higher than the first accuracy. Moreover, the first data and the second data are determined using at least one sensor operable on the first zone and on the second zone. Furthermore, the at least one sensor comprises at least one IR absorption sensor and at least one interferometry sensor: the at least one IR absorption sensor is operable on the first zone of the body, to determine, at the first accuracy, the first data: and the at least one interferometry sensor is operable on the second zone of the body to determine, at the second accuracy, the second data.

The considerations and advantages of aspects of the sensor system may apply, mutatis mutandis, to aspects of the method for determining a thickness of a material body. In particular, the advantages described above for aspects the sensor system may also apply, mutatis mutandis, to aspects of the method described below.

Preferably, the at least one sensor comprises at least one of the following: an infrared, IR, absorption sensor: an interferometry sensor: an ultrasonic sensor; an electromagnetic sensor, preferably a Hall sensor or a capacitive sensor.

Preferably, said taking into account of the first data as well as the second data comprises using the second data to interpret the first data.

Preferably, said taking into account of the first data as well as the second data comprises setting a reference value for the first data based on the second data.

Preferably, the second zone is at least partially, preferably entirely, contained in the first zone.

Preferably, at least one of the first zone and the second zone is a composite zone comprising a plurality of mutually disjoint zones.

Preferably, the method comprises arranging each sensor with at least one receiver and at least one complementary emitter.

Preferably, the at least one sensor is positioned such that its emitted signals travel perpendicularly to a tangent of at least one of the first zone and the second zone.

Preferably, in a further developed aspect, at least the steps of determining the first data, determining the second data, and providing the first data and the second data to the processor are performed by a sensor system according to any of the aspects of a sensor system as described above.

According to another aspect of the present disclosure, there is provided a method for adjusting a production process of a material body, the method comprising: determining the thickness of the body according to the method for determining the thickness of a material body of any one of the aspects described above: based on a condition that the thickness of the body is outside a tolerance range, determining at least one adjustment for at least one parameter of the production process: and adjusting the at least one parameter of the production process based on the determined at least one adjustment.

The considerations and advantages of aspects of the sensor system may apply, mutatis mutandis, to aspects of the method for adjusting a production process of a material body. In particular, the advantages described above for aspects the sensor system may also apply, mutatis mutandis, to aspects of the method described below.

Preferably, the production process is performed by a production machine according to any one of the above-described aspects of the production machine. It is particularly preferred if the production machine is a bottle blowing machine, but it is limited to only these types of production machines. In case that the production machine is a bottle blowing machine, the material body is of course preferably a bottle.

Preferably, the at least one parameter is selected from the following: a pressure of the production process of the material body: a temperature of the production process of the material body: a temperature profile of the material body: a heating time of the material body: and a starting time delay of the production process of the material body.

In this manner, the production process may be adjusting by adjusting impactful parameters.

According to another aspect of the present disclosure, there is provided a use of a sensor system according to any one of the above-described aspects of the sensor system, for adjusting a production process of a material body according to the method of any one of the above-described aspects of the method for adjusting the production process of the material body.

The skilled person will understand that at least some aspects according to the present disclosure may be applicable with objects having multiple layers of an identical material. The skilled person will note that aspects according to the present disclosure may also be applicable with objects having multiple layers with different refractive indices. For example, an IR absorption sensor may determine an overall thickness of the object, while an interferometry sensor may be configured to determine a composite thickness based on the multiple intensity peaks (one more than the number of layers) on the spectral graph.

BRIEF DESCRIPTION OF THE FIGURES

Aspects according to the present disclosure will be more fully understood with the help of the appended figures, in which.

DETAILED DESCRIPTION AND EXAMPLES

Unless otherwise defined or specified, all terms should be accorded a technical meaning consistent with the usual meaning in the art as understood by the skilled person.

When used in these specification and claims, the terms "comprises" and "comprising" and variations thereof mean that the specified features, steps or integers are included. The terms are not to be interpreted to exclude the presence of other features, steps or components.

Figure 1:
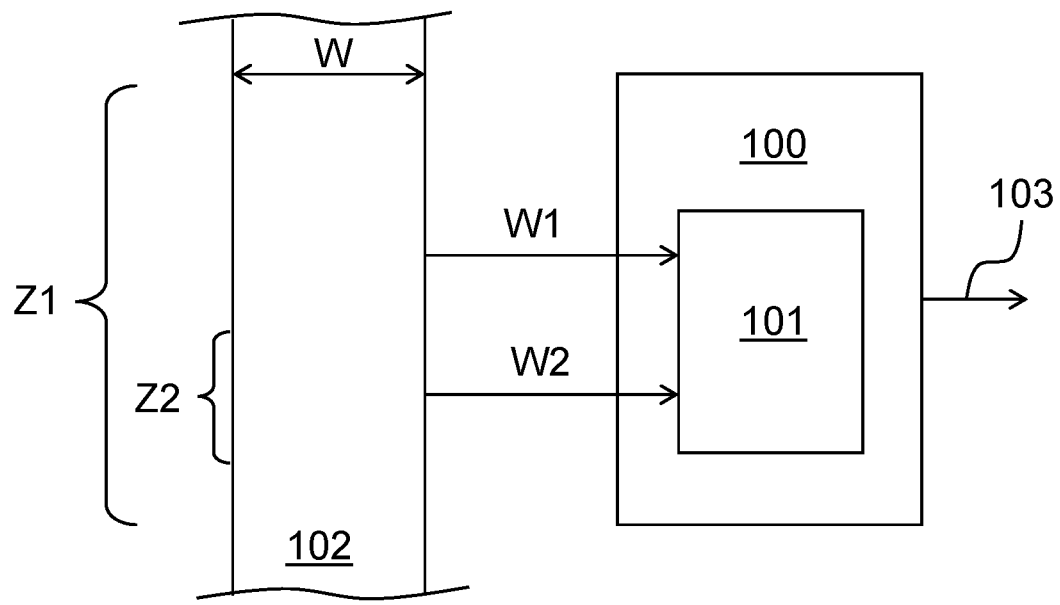
FIG. 1 schematically represents an aspect of a sensor system according to the present disclosure.

FIG. 1 schematically represents an aspect of a sensor system 100 according to the present disclosure. Sensor system 100 serves for determining a thickness W of a material body 102. The body 102 may be made of any type of material, and may be of any type or shape, e.g. a machined tool or a film or a container or a carrier. An example container is for instance a bottle, such as a PET bottle. Sensor system 100 comprises at least one sensor 101, wherein the at least one sensor 101 comprises at least one IR absorption sensor and at least one interferometry sensor.

The at least one IR absorption sensor of the at least one sensor 101 is operable on a first zone Z1 of the body 102, to determine, at a first accuracy, first data relating to a first parameter pertaining to a first thickness W1 of the first zone Z1. The at least one interferometry sensor of the at least one sensor 101 is operable on a second zone Z2 of the body 102, to determine, at a second accuracy, second data relating to a second parameter pertaining to a second thickness W2 of the second zone Z2 at a second accuracy, the second accuracy being higher than the first accuracy. The sensor system 100 is further configured for providing the first data and the second data—and thus explicitly or implicitly the first thickness W1 and the second thickness W2—to a processor (not shown), the processor being configured for taking into account the first data as well as the second data to determine the thickness W of the body 102 over the first zone Z1 at an accuracy higher than the first accuracy. The sensor system 100 may comprise a processor interface 103 for said providing.

Note that, overall, the processor can thus determine the thickness W1 of the body over the first zone Z1 at a higher accuracy than the first accuracy and also the thickness W2 of the body over the second zone Z2. If the second zone Z2 includes at least a part outside of the first zone Z1, the processor can thus determine the thickness of the body at least over the first zone Z1 at the higher accuracy, but also over the second zone Z2. Moreover, the processor can readily estimate the thickness of the body outside of the first zone Z1 and the second zone Z2, e.g. by estimating that thickness to be the same as the thickness W1 of the first zone Z1.

Note that there is no limitation on the order in which the first and the second data are determined: it is conceivable to first determine the first data and then the second data, but also to first determine the second data and then the first data, or even—if the at least one sensor 101 permits this functionality—to simultaneously determine the first data and the second data.

In a particular aspect, the at least one sensor may be more accurate when operating on the first zone at the first accuracy for a first range of measurements than when operating on the second zone at the second accuracy, but the very same at least one sensor may be less accurate when operating on the first zone for a second range of measurements than when operating on the second zone. In other words, one sensor or multiple sensors may be more accurate for a given range of measurements than for another range of measurements. In this particular aspect, it may be preferred to switch the roles of the one sensor or of the multiple sensors for the second range of measurements compared to the first range of measurements, in order to better determine the thickness of the material body. The skilled person will understand that this situation is not intended to deviate from the aspects according to the present disclosure, because for the second range of measurements, the naming "first" and "second" can simply be reversed as compared to the first range of measurements.

In the context of the present disclosure, a zone may be an area, for example a surface area, of the material body when considered in two dimensions, or a volume of the material body when considered in three dimensions. However, a zone may also be a straight line, a curved line, or a point—if not mathematically, then at least from an engineering perspective. Moreover, a zone may be composite, as defined above.

The skilled person in the field of sensor systems and/or computer technology will understand that the notion of data relating to a parameter pertaining to a thickness is handily usable in the following way: the thickness may be interpreted as the actual tangible volumetric thickness, the parameter pertaining to the thickness may be interpreted as either that thickness or another physical parameter that can be reduced to or converted into that thickness, for example absorption energy, spectral distance, capacitance, etc., and data relating to that parameter may be interpreted as any suitable representation of such a parameter, for example as one or more numerical values and/or as an analog signal, e.g. an electrical signal, characterized by at least one of frequency, amplitude, shape, voltage and current.

Figure 2:
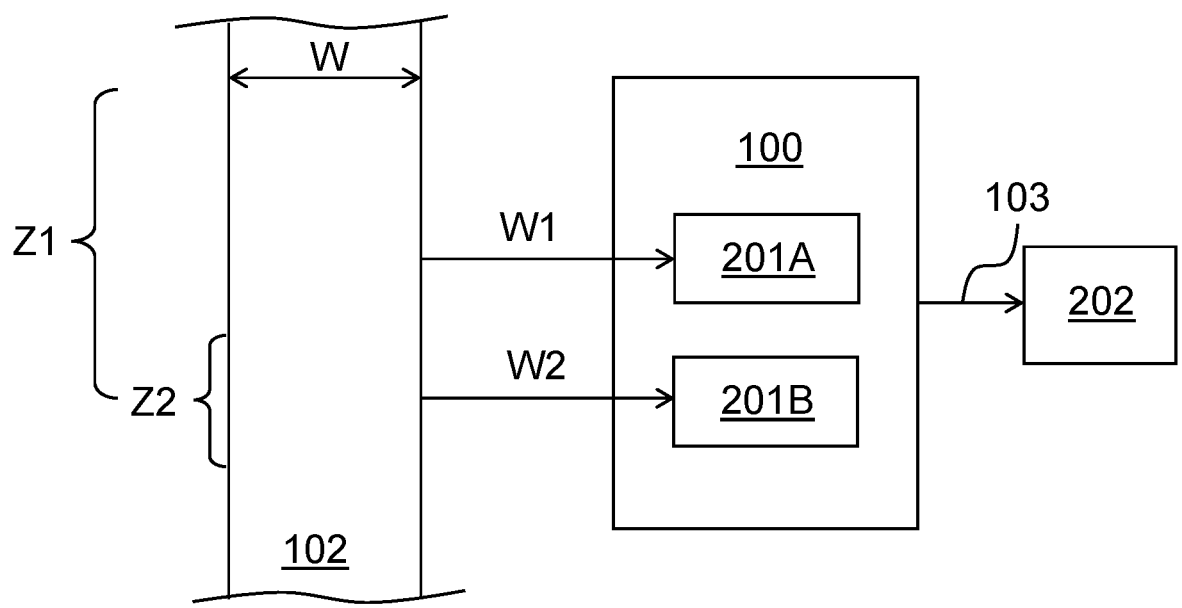
FIG. 2 schematically represents another aspect of a sensor system according to the present disclosure.

FIG. 2 schematically represents another aspect of a sensor system 100 according to the present disclosure. The sensor system 100 of FIG. 2 corresponds to the above-described sensor system 100 of FIG. 1, except in that it comprises a plurality of sensors. In this specific example, there are two sensors, namely sensor 201A and sensor 201B. Sensor 201A comprises at least one IR absorption sensor and sensor 201B comprises at least one interferometry sensor. Sensor 201A is operable on the first zone Z1 of the body 102, to determine, at a first accuracy, the first data relating to a first parameter pertaining to the first thickness W1 of the first zone Z1. Sensor 201B is operable on the second zone Z2 of the body 102, to determine, at a second accuracy, second data relating to a second parameter pertaining to the second thickness W2 of the second zone Z2. Again, the second accuracy is higher than the first accuracy.

It is to be understood the sensor system may advantageously comprise more than two sensors. In that case, the processor may be further configured for taking into account the data respectively determined by the more than two sensors in order to determine the thickness W of the body 102 over the first zone Z1.

FIG. 2 also shows optional processor 202, coupled to processor interface 103 of sensor system 100. Preferably, processor 202 may even be included in sensor system 100. In that case, processor interface 103 may e.g. be an internal data path.

Note that FIG. 2 further differs from FIG. 1 in that in FIG. 1, the second zone Z2 is entirely contained within the first zone Z1, whereas in FIG. 2, the second zone Z2 is only partially contained within the first zone Z1. This is advantageous to cover a larger overall area of material body 102. In both figures, the second zone Z2 is smaller than the first zone Z1 in this aspect, but this is not essential.

Note that the aspect of comprising a plurality of sensors can be considered separately from (and can be combined with other aspects independently from) the aspect of the second zone Z2 being only partially contained within the first zone Z1.

In another, particularly preferred, exemplary aspect, the elements in FIG. 2 may be interpreted as described above, with the further specification that material body 102 is part of an object, such as a container, e.g. a bottle, especially a PET bottle—in particular material body 102 as shown in this figure may represent a sidewall of such an object although this exemplary aspect may instead refer to any other part of an object, than a wall, whose thickness may be of interest, that sensor system 100 is preferably comprised in a production machine, in particular e.g. a blowing machine like a bottle blowing machine or another production machine involved in the production, in particular the production of bottles, that sensor 201A is preferably an IR absorption sensor, and that sensor 201B is preferably an interferometry sensor.

It is noted that material body 102 may be part of any type of object, including a container (e.g. a bottle), but also any other type of object than a container, e.g. a web or a strip, and it may be formed of a material like PET or another plastic material, or even of paper or cardboard, or even a combination thereof.

Figure 3:
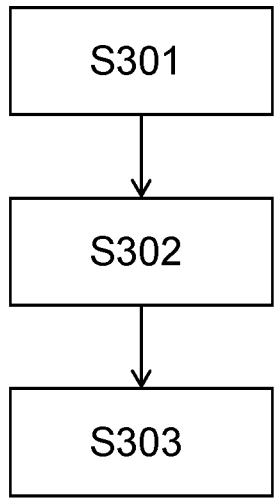
FIG. 3 schematically represents an aspect of a method for determining a thickness of a material body according to the present disclosure.

FIG. 3 schematically represents an aspect of a method for determining a thickness of a material body according to the present disclosure. The material body may for example be body 102 of FIGS. 1 and 2, e.g. a container such as a bottle. The method may comprise as step S301 determining, at a first accuracy, first data relating to a first parameter pertaining to thickness of a first zone of the body. The method may comprise as step S302 determining, at a second accuracy, second data relating to a second parameter pertaining to thickness of a second zone of the body, the second accuracy being higher than the first accuracy. The method may comprise as step S303 providing the first data and the second data to a processor, the processor being configured for taking into account the first data as well as the second data to determine the thickness of the body over the first zone at an accuracy higher than the first accuracy. Moreover, the first data and the second data are determined using at least one sensor operable on the first zone and on the second zone, the at least one sensor comprises at least one IR absorption sensor and at least one interferometry sensor, the at least one IR absorption sensor is operable on the first zone of the body, to determine, at the first accuracy, the first data: and the at least one interferometry sensor is operable on the second zone of the body to determine, at the second accuracy, the second data.

It is to be understood that other steps of aspects of the method for determining a thickness according to the present disclosure may be readily integrated into the schematic diagram of FIG. 3.

Preferably, there may optionally be provided at least one receiver and at least one complementary emitter. For example, if sensor 201A is an IR absorption sensor, it may comprise an IR receiver 201A and an IR emitter on the opposite side (i.e. on the left in FIGS. 1 and 2) of body 102, in order to radiate IR light through the second zone Z2 of body 102 towards IR receiver 201A. Also, if sensor 201B is an interferometry sensor, e.g. an IR interferometry sensor, a suitable emitter, e.g. an IR emitter, may be provided, preferably near the interferometry receiver (i.e. on the right in FIGS. 1 and 2), or even inside the same housing as sensor system 100. Of course, via a suitable use of mirrors or other guiding instrument, an emitter of the at least one complementary emitter and its complementary receiver.

Figure 4:
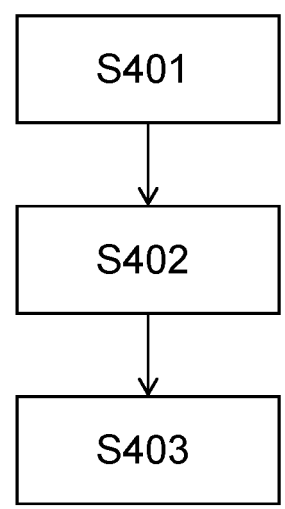
FIG. 4 schematically represents an aspect of a method for adjusting a production process of a material body according to the present disclosure.

FIG. 4 schematically represents an aspect of a method for adjusting a production process of a material body according to the present disclosure. The method may comprise as step S401 determining the thickness of the body over the first zone according to the method for determining the thickness of the body of any one of the above-described aspects, e.g. the method aspect illustrated in FIG. 3. The method may further comprise as step S402 determining at least one adjustment for at least one parameter of the production process, based on a condition that the thickness of the body over the first zone is outside a tolerance range. The method may also comprise as step S403 adjusting the at least one parameter of the production process based on the determined at least one adjustment.

It is to be understood that other steps of aspects of the method for adjusting a production process according to the present disclosure may be readily integrated into the schematic diagram of FIG. 4.

Although certain aspects of the invention have been described, the scope of the appended claims is not intended to be limited solely to these specific aspects. The claims are to be construed literally, purposively, and/or to encompass equivalents.

The invention claimed is:

1. Sensor system for determining a thickness of a material body, e.g. a container such as a bottle, comprising at least one sensor;
    wherein the at least one sensor is operable on a first zone of the body, to determine, at a first accuracy, first data relating to a first parameter pertaining to thickness of the first zone;
    wherein the at least one sensor is operable on a second zone of the body, to determine, at a second accuracy, second data relating to a second parameter pertaining to thickness of the second zone, the second accuracy being higher than the first accuracy; and
    wherein the sensor system is configured for providing the first data and the second data to a processor, the processor being configured for taking into account the first data as well as the second data to determine the thickness of the body over the first zone at an accuracy higher than the first accuracy;
    wherein the at least one sensor comprises at least one IR absorption sensor and at least one interferometry sensor;
    wherein the at least one IR absorption sensor is operable on the first zone of the body, to determine, at the first accuracy, the first data; and
    wherein the at least one interferometry sensor is operable on the second zone of the body to determine, at the second accuracy, the second data.

2. The sensor system according to claim 1, wherein the second zone is at least partially, preferably entirely, contained in the first zone.

3. The sensor system according to claim 1, wherein at least one of the first zone and the second zone is a composite zone comprising a plurality of mutually disjoint zones.

4. The sensor system according to claim 1, wherein the at least one sensor is positioned such that its emitted signals travel perpendicularly to a tangent of at least one of the first zone and the second zone.

5. Production machine comprising a sensor system according to claim 1.

6. Method for determining a thickness of a material body, e.g. a container such as a bottle, the method comprising:
    determining, at a first accuracy, first data relating to a first parameter pertaining to thickness of a first zone of the body;
    determining, at a second accuracy, second data relating to a second parameter pertaining to thickness of a second zone of the body, the second accuracy being higher than the first accuracy; and
    providing the first data and the second data to a processor, the processor being configured for taking into account the first data as well as the second data to determine the thickness of the body over the first zone at an accuracy higher than the first accuracy;
    wherein the first data and the second data are determined using at least one sensor operable on the first zone and on the second zone; and
    wherein the at least one sensor comprises at least one IR absorption sensor and at least one interferometry sensor;
    wherein the at least one IR absorption sensor is operable on the first zone of the body, to determine, at the first accuracy, the first data; and
    wherein the at least one interferometry sensor is operable on the second zone of the body to determine, at the second accuracy, the second data.

7. The method according to claim 6, wherein the second zone is at least partially, preferably entirely, contained in the first zone.

8. The method according to claim 6, wherein at least one of the first zone and the second zone is a composite zone comprising a plurality of mutually disjoint zones.

9. The method according to claim 6, wherein at least the steps of determining the first data, determining the second data, and providing the first data and the second data to the processor are performed by a sensor system according to claim 1.

10. Method for adjusting a production process of a material body, the method comprising:
   determining the thickness of the body over the first zone according to a method of claim 6;
   based on a condition that the thickness of the body over the first zone is outside a tolerance range, determining at least one adjustment for at least one parameter of the production process; and
   adjusting the at least one parameter of the production process based on the determined at least one adjustment.

11. The method according to claim 10, wherein the production process is performed by a production machine according to claim 5.

12. The method according to claim 10, wherein the at least one parameter is selected from the following:
   a pressure of the production process of the material body;
   a temperature of the production process of the material body;
   a temperature profile of the material body;
   a heating time of the material body; and
   a starting time delay of the production process of the material body.

* * * * *